Feb. 11, 1969 A. WEYRAUCH 3,427,463
DISPLACEMENT MEASURING DEVICE USING GRATINGS HAVING SLITS
AT SPECIFIED SPACINGS AND AT SPECIFIED ANGLE
TO ELIMINATE HARMONICS
Filed May 18, 1966 Sheet 1 of 2

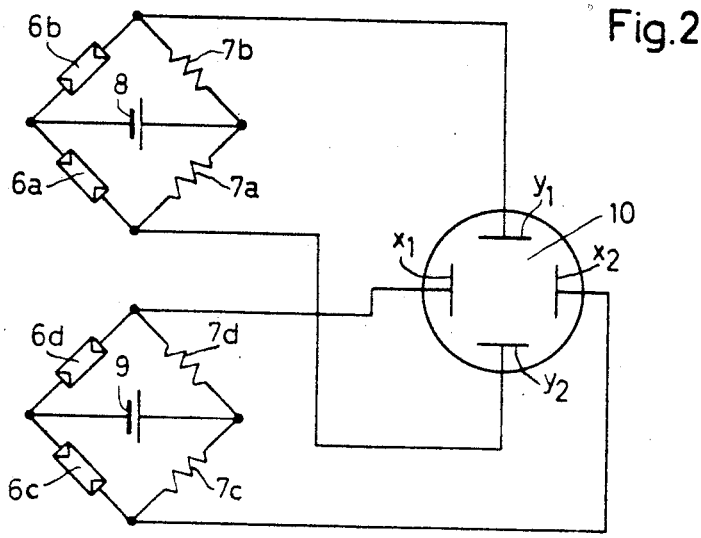
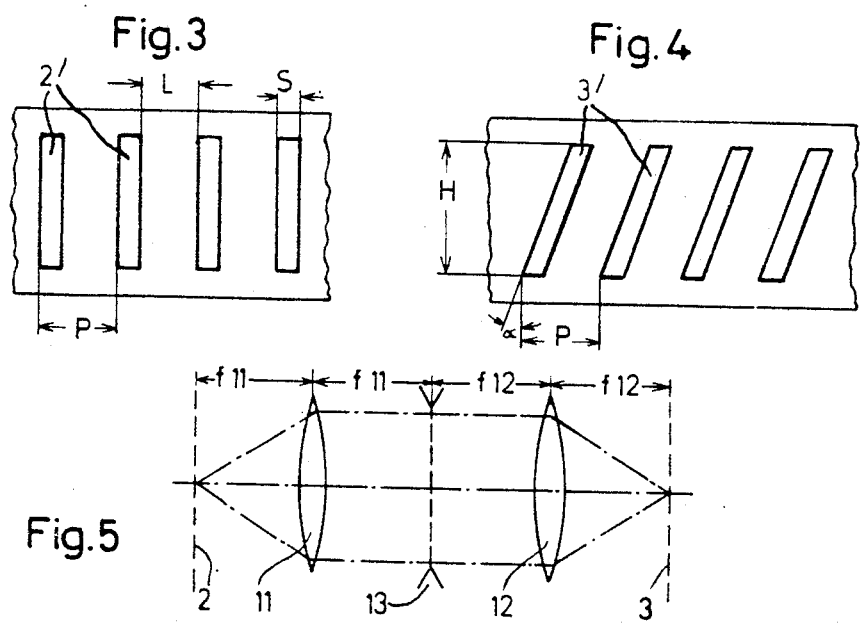

United States Patent Office 3,427,463
Patented Feb. 11, 1969

3,427,463
DISPLACEMENT MEASURING DEVICE USING GRATINGS HAVING SLITS AT SPECIFIED SPACINGS AND AT SPECIFIED ANGLE TO ELIMINATE HARMONICS
Adolf Weyrauch, Aalen, Wurttemberg, Germany, assignor to Carl Zeiss-Stiftung, doing business as Carl Zeiss, Heidenheim (Brenz), Wurttemberg, Germany, a corporation of Germany
Filed May 18, 1966, Ser. No. 551,131
Claims priority, application Germany, May 28, 1965, Z 11,560
U.S. Cl. 250—237          6 Claims
Int. Cl. H01j 3/14, 5/16

ABSTRACT OF THE DISCLOSURE

A device for measuring the change in relative position between two movable systems, such as a reciprocating carriage and the stationary frame of a machine tool. The device comprises a stationary receiver screen system of at least two screen elements having screen bars and spaces therebetween, whereby the spaces denote the scanning period length of the screen elements and the screen bars of one of said screen elements are displaced relative to the screen bars of the other screen element by one half of the scanning period length, and a transversely reciprocable emitter screen system having screen bars and spaces in predetermined relationship to the bars and spaces in the stationary receiver system. An optical illuminating system is arranged to face the emitter screen system so that the light rays passing first through the latter and then through the receiver screen system will energize photoelectric receivers facing said receiver screen system.

This invention relates to a device for measuring the change in relative position of two systems that are movable one with respect to the other and in which the measuring is effected by photoelectric screen scanning.

It is well known to provide each one of two movable systems, as for instance, the reciprocating carriage and the stationary frame of a machine tool, with an optical screen or a screen system so that the screen will be photoelectrically scanned in such a manner that the effective movement between the two systems will affect the photoelectric receiver of the scanning system with periodically changing light intensity.

The signals derived from such known arrangements have generally not a sine- or cosine-shaped wave form but are more or less in the form of direct current having ripples of superimposed harmonics. Since in known devices of this kind, the signals are chiefly registered directly, for instance, by a counter, the actual shape of the signal wave is of minor consequence to the final result.

When, however, the signal derived by the scanning procedure shall, for further interpolation, be introduced into an electric analogous digital converter, for instance, in the form of a cathode ray tube with a revolving electron beam and screen elements in the orbital path thereof, then a signal of purely sine- or cosine-shape is of essential advantage.

It is an object of the present invention to provide a system from which the desirable signal can be obtained, in that at least one double scanning, consisting of two scaning actions displaced by one half scanning or signal period, is effected and that then each of these two scanning signals is fed through an electric subtraction circuit to be combined to a single measuring or control signal.

In case two double scanning actions are to be effected, it has been found advisable to displace the four scanning locations from one another by the length of one quarter signal period.

In continuation of this invention, the two screen systems, one being the emitter screen, the other the receiver screen, and both being movable with respect to each other, are preferably designed so that they have a bar width of $$S = \frac{m_1 \times P}{n}$$

and a space width of $$L = \frac{m_2 \times P}{n}$$

wherein $P=$ scanning period length of the screens, $n=$ order number of a harmonic of the scanning signals, and $m_1$ and $m_2$ are integral numbers which meet the condition $m_1 + m_2 = n$.

In accordance with this invention, the two screen systems which are slidable with respect to each other, are preferably also inclined toward each other at a predetermined angle $\alpha$, whereby the angle of inclination preferably fulfills the equation $$tg\alpha = \frac{P}{n \times H}$$

wherein $P=$scanning period length of the screen, $H=$ height of the screen bars, and $n=$order number of a harmonic of the scanning signals.

This invention further provides that in case both screen systems are focused upon each other so that the image of one is projected on the other, an aperture diaphragm, preferably a screenlike aperture is interposed in the path of the projected rays of light.

It will be understood that the several scanning systems disclosed by this invention can be employed each by themselves or in any desirable combination of several systems.

For a more complete understanding of the entire scope of this invention, a detailed description of some preferred embodiments will now be given with reference to the accompanying drawings, in which:

FIG. 2 is a circuit diagram showing the connections of the photoelectric receiver arrangement to the deflecting plates of a cathode-ray tube;

FIG. 3 is a plan view of a fraction of an emitter screen depicting the relationship between length of scanning period of the screen, width of screen bars, and width of screen spaces;

FIG. 4 is another fractional plan view of a screen element having inclined screen bars; and FIG. 5 is a diagrammatic showing of an arrangement in which an emitter screen and a receiver screen are focused on each other and in which an aperture diaphragm is interposed between the focusing lenses.

Figure 1:
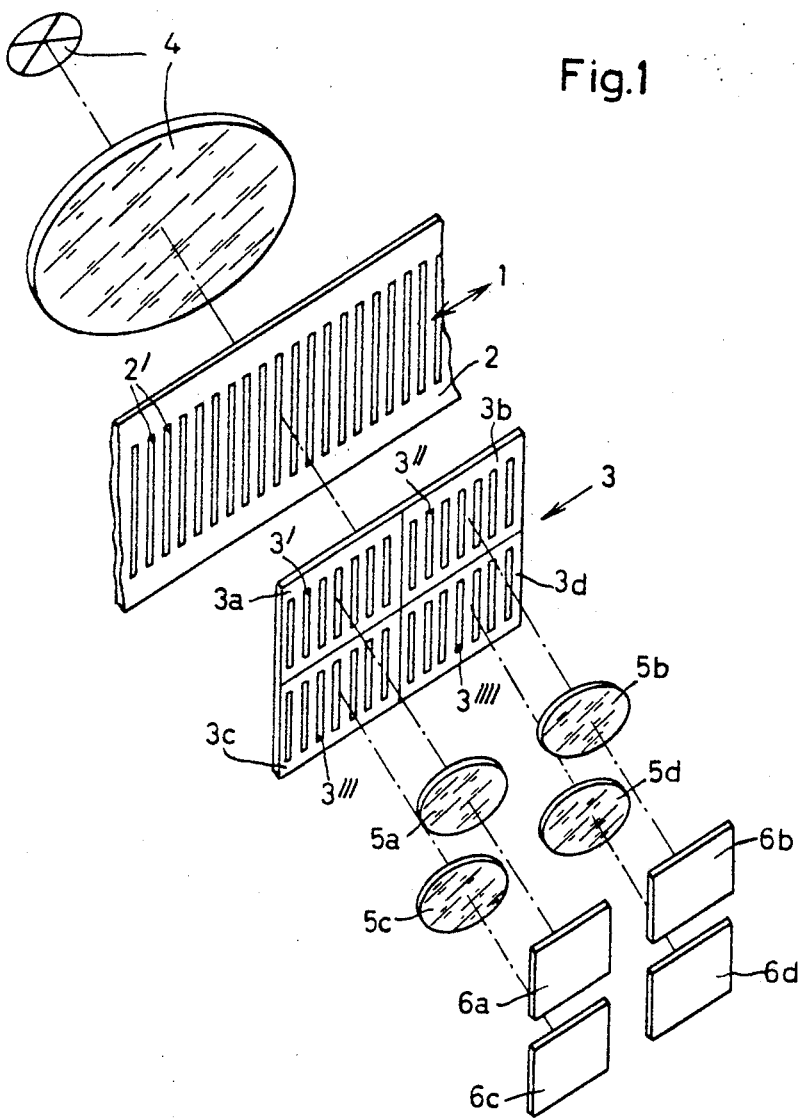
FIG. 1 is a perspective view showing the parts of a scanning device according to this invention in disassembled relation.

Referring to FIG. 1, an emitter screen 2 is arranged for reciprocating movement in the directions of double arrow 1. This screen 2 may be considered to be rigidly mounted on the slidable carriage of a machine tool. A stationary receiver screen system 3 associated with the screen 2 is shown to consist of four screen elements 3a, 3b, 3c, and 3d arranged to form each one a quarter of the whole surface area of the system. This arrangement of four screen elements is good for two double scannings, and it should be understood that only two screen elements, say 3a and 3b, are required for simple double scanning. The screen bars 3' of screen element 3a are displaced with respect to the screen bars 3" of screen element 3b for the amount of one half of the scanning period length of the screen elements, whereby the scanning period length of a screen is equal to the spacing of the screen bars. Similarly, the screen bars 3''' of the screen element 3c are displaced with respect to the screen bars 3'''' of screen element 3d for the same amount. Moreover, the screen bars of the pair of screen elements 3a, 3b at the top, and the screen bars of the pair of screen elements 3c, 3d at the bottom, each of these pairs providing for simple double scanning, are staggered with respect to each other for the amount of one quarter of the scanning period length. Thus, when considering the length of one whole scanning period or one cycle of the signal as being $2\pi$, and assuming that when scanning the screen element 3a will show at a certain instant the phase 0, the screen element 3b will show simultaneously the phase $\pi$, and correspondingly, the screen element 3c, the phase $\pi/2$, and the screen element 3d, the phase $3/2\pi$.

In actual assembly, the two screen systems 2 and 3 are mounted in close proximity and screen system 2 is arranged for sliding movement with respect to the screen system 3, and an optical illuminating system 4 is arranged to illuminate the screens. The light rays passing through the screen elements 3a, 3b, 3c and 3d are projected by the lenses 5a, 5b, 5c and 5d respectively to impinge on the corresponding photo receivers 6a, 6b, 6c and 6d for initiation of the electrical signals.

The circuit arrangement for the photo receivers 6a, 6b, 6c and 6d in arms of two bridge arrangements, forming in combination a subtraction circuit, are shown in FIG. 2. The other arms of the bridges are formed by suitable resistors 7a, 7b, 7c and 7d respectively. The current potential sources of the bridges in the form of batteries are indicated at 8 and 9 and the balancing points are connected to deflecting plates $x_1$, $x_2$, $y_1$ and $y_2$ of a cathode-ray tube 10.

By means of the double scanning system described with reference to FIG. 1 and the subtraction circuit arrangement of FIG. 2, it is possible to eleminate the direct-current component and the harmonics of even order ($n=2, 4, 6$ and so forth) from the signal output.

Other harmonics can be eliminated by a suitable construction of the emitter screen 2 and/or the receiver screen system 3. The FIG. 3 shows a fragmentary plan view of the emitter screen 2 with screen bars 2'. The length of the scanning period of the screen is given as P, the width of the screen bars is indicated as S, and the width of the spaces as L. When now the emitter screen 2 or the receiver screen 3 has, for instance, a space to bar relationship of 2 to 1 and the respectively cooperating screen has a space to bar relationship of 3 to 2 or 4 to 1, and when incoherent light is used in the illuminating system 4 (FIG. 1), the 3rd and 5th harmonics and their integral multiples will be eliminated from the derived signal voltage wave. It is here assumed that the bars S are impervious to light and the spaces L transparent or translucent. However, it should be understood that also reversed light-passing conditions are possible.

Furthermore, in another aspect of the invention, it is also possible to eliminate additional harmonics and their integral multiples by a somewhat inclined arrangement of the receiver screen with respect to the emitter screen, and this owing to the phenomenon of the "moiré" effect. So it is possible to eliminate the $n$th harmonic when the inclination of the screens fulfills the condition $$tg\alpha = \frac{P}{n \times H}$$

where P is the scanning period of the screens, H is the height of the screen bars, and $n$ is the order number of a harmonic of the scanning signals. To illustrate inclined screen arrangement, the FIG. 4 shows a portion of a receiver screen 3 in which only the screen bars 3' are inclined.

The FIG. 5 shows an arrangement in which emitter screen 2 and receiver screen 3 are focused on each other, whereby the image of one is projected on the other by means of focusing lenses 11 and 12 having focal lengths $f_{11}$ and $f_{12}$ respectively. When interposing in such arrangement, in accordance with this invention, an aperture diaphragm 13 between the lenses 11 and 12, it is possible to eliminate by pupillary influence, for instance, all harmonics above a certain order as given by proper proportioning of the aperture 13. It is thereby not necessary to focus in the relationship 1 to 1 as illustrated in the figure, however, when other relationships are chosen, it becomes necessary to consider the image relationship in the design of the screens.

From optical fundamentals it is known that the contrast transfer function becomes 0 when $$\frac{n \times F \times \lambda}{P} \geq 1$$

where $n$ is the order number of the harmonic, $\lambda$ is the wave length of light used, P is the scanning period length of the screen and also the period of the signal, and F is the aperture setting number of the lens. From this relationship it follows that all harmonics lying above the order number $n$ are eliminated when the aperture setting number of the lens is $$F = \frac{P}{n \times \lambda}$$

From the above it will be apparent that long screen scanning periods lead to high aperture setting numbers, which means small aperture openings and consequently low light efficiency. This disadvantage can be obviated in that the aperture diaphragm 13 is made with a rectangular aperture and the length of the small side of the rectangle is inserted in the formula to comply with the condition for harmonics elimination.

There is still another possibility for increasing the light yield of the system provided by this invention. In this modification the pupil in the form of aperture diaphragm 13 is of screenlike construction. The period length of such aperture screen must fulfill the condition $$P_A = \frac{f_{11} \times n \times \lambda}{P_S}$$

where $\lambda$ is the wave length of the light used, $f_{11}$ is the focal length of the lens 11, $n$ is the order number of the harmonics, and $P_S$ is the length of the scanning period of the emitter screen.

For a practical example it may be assumed that it is desirable to eliminate the 11th harmonic ($n=11$) and the integral multiples thereof, and that $P_S$ is 1 mm., $f_{11}$ is 100 mm., and $\lambda$ is 500 nanometers. Then the length of the scanning period of the aperture screen would have to be $$P_A = \frac{100 \times 11 \times 0.0005}{1} = 0.55 \text{ mm.}$$

What I claim is:

1. A device for measuring the change in relative position of two systems movable with respect to each other and comprising a stationary receiver screen system of at least two screen elements and a transversely reciprocable emitter screen system arranged in proximity to said stationary receiver screen system, each one of said two screen systems having screen bars and screen spaces therebetween, the bars having a width of $$S = \frac{m_1 \times P}{n}$$

and the spaces having a width of $$L = \frac{m_2 \times P}{n}$$

where P is the length of the scanning period of said screen, $n$ is the order number of a harmonic of the scanning signals to be produced, and $m_1$ and $m_2$ are integral numbers fulfilling the condition $m_1 + m_2 = n$, an optical illuminating system arranged at one side of said two screen systems and facing said emitter screen system, at least two photoelectric receivers at the opposite side of said two screen systems and facing said receiver screen system, one of said receivers receiving light rays passing through said reciprocable emitter screen system and one of said two screen elements in said stationary receiver screen system, and the other of said receivers receiving light rays passing through said reciprocable emitter screen system and the other of said two screen elements in said stationary emitter screen system, whereby double scanning is achieved in that said light rays are shifted in phase one against the other for one half scanning period length by the corresponding displacement of the screen bars.

2. A device according to claim 1 in which said stationary receiver screen system comprises four screen elements, each element having screen bars and spaces therebetween, the spacing between bars being the scanning period length of the screen elements, said four screen elements being arranged in pairs, one top pair and one bottom pair, the screen bars of one of said top screen elements being displaced against the screen bars of the other of said pair of top screen elements by one half of the scanning period length, the screen bars in the bottom pair of screen elements being staggered against the respective bars in the top pair by one quarter scanning period length, while said reciprocable emitter system has screen bars and spaces in predetermined spacing relationship to the spacing of bars and spaces in the screen elements of said stationary emitter screen system, said optical illuminating system comprising four photoelectric receivers at the opposite side of said two screen systems, each of said receivers receiving light rays passing through said reciprocable emitter screen system and one respective screen element in said stationary receiver screen system whereby to achieve two double scanning actions in that said light rays are shifted in phase to be separated by one quarter period by the correspondingly displaced and staggered screen bars in the respective screen elements, and means for combining the signals derived from said photoelectric converters into one resulting signal.

3. A screen arrangement for a device according to claim 1, in which the bars in one screen are inclined with respect to the bars in the other screen at an angle α fulfilling the condition $$tg\alpha = \frac{P}{n \times H}$$

where P is the length of the scanning period of said screens, H is the height of said screen bars, and $n$ is the order number of a harmonic of the scanning signal.

4. A screen arrangement for a device according to claim 1, including two focusing lenses interposed between said two screen systems and being operative in focusing an image of one screen on the other and vice versa, and an aperture diaphragm inserted in the light ray path between said lenses.

5. A device as defined in claim 2, in which said last-named means comprise two bridge-type circuits combined in one subtraction circuit, and a cathode-ray tube having four deflecting plates of which each is influenced by one of said photoelectric converters.

6. A screen arrangement as defined in claim 4, wherein said aperature diaphragm has a screenlike configuration.

References Cited

UNITED STATES PATENTS

| | | | |
|---|---|---|---|
| 2,857,802 | 10/1958 | Cail | 250—237 |
| 2,886,717 | 4/1959 | Williamson et al. | 250—237 |
| 3,309,525 | 3/1967 | Johnson | 250—233 |

RALPH G. NILSON, *Primary Examiner.*

M. ABRAMSON, *Assistant Examiner.*